United States Patent
Hund et al.

(10) Patent No.: US 10,461,578 B2
(45) Date of Patent: Oct. 29, 2019

(54) OPTIMIZING THE DISTRIBUTION OF ELECTRICAL ENERGY

(71) Applicant: SIEMENS AKTIENGESELLSCHAFT, München (DE)

(72) Inventors: Johannes Hund, München (DE); Richard Kuntschke, Geisenhausen (DE)

(73) Assignee: Siemens Aktiengesellschaft (DE)

( * ) Notice: Subject to any disclaimer, the term of this patent is extended or adjusted under 35 U.S.C. 154(b) by 135 days.

(21) Appl. No.: 15/112,701

(22) PCT Filed: Nov. 10, 2014

(86) PCT No.: PCT/EP2014/074177
§ 371 (c)(1),
(2) Date: Jul. 20, 2016

(87) PCT Pub. No.: WO2015/113662
PCT Pub. Date: Aug. 6, 2015

(65) Prior Publication Data
US 2016/0344234 A1    Nov. 24, 2016

(30) Foreign Application Priority Data

Jan. 29, 2014  (DE) .................. 10 2014 201 555

(51) Int. Cl.
*G05D 3/12* (2006.01)
*G05D 5/00* (2006.01)
(Continued)

(52) U.S. Cl.
CPC ........ *H02J 13/0003* (2013.01); *G05B 13/021* (2013.01); *G06Q 10/0631* (2013.01); *H02J 13/0006* (2013.01)

(58) Field of Classification Search
CPC .... G06Q 50/06; G06Q 10/04; G06Q 30/0202; G06Q 30/08; G06Q 10/06;
(Continued)

(56) References Cited

U.S. PATENT DOCUMENTS 6,681,156 B1 * 1/2004 Weiss ..................... G06Q 40/04
                                                            700/286
7,188,260 B1 * 3/2007 Shaffer ................... G06F 1/189
                                                            700/291
(Continued)

FOREIGN PATENT DOCUMENTS

DE        102011078045 A1    12/2012

OTHER PUBLICATIONS

Zibin Z. et al; "A Distributed Replication Strategy Evaluation and Selection Framework for Fault Tolerant Web Services"; 2008 IEEE International Conference no Web Services, ICWS '08, IEEE, Piscataway, NJ; pp. 145-152; ISBN: 978-0-7695-3310-0; XP031360570; 2008.

(Continued)

*Primary Examiner* — Zhipeng Wang
(74) *Attorney, Agent, or Firm* — Schmeiser, Olsen & Watts LLP

(57) ABSTRACT

Methods and systems are provided for optimizing the distribution of electrical energy in an electrical power supply system which includes autonomous supply system regions, including the method steps of: —receiving input data by at least two dispatcher instances, wherein the input data represents energy intervals which are requested by the autonomous supply system regions; —calculating at least one solution of the distribution of electrical energy to the supply system regions by each of the at least two dispatcher instances; —selecting one of the calculated solutions for the distribution of electrical energy in the power supply system by a leader election. The disclosed relates to the technical (Continued)

field of distributing electrical energy and can be used, for example, for smart grids.

20 Claims, 3 Drawing Sheets

(51) Int. Cl.
  *G05D 9/00* (2006.01)
  *G05D 11/00* (2006.01)
  *G05D 17/00* (2006.01)
  *H02J 13/00* (2006.01)
  *G06Q 10/06* (2012.01)
  *G05B 13/02* (2006.01)
(58) Field of Classification Search
  CPC .... G06Q 10/0631; G06Q 40/00; G06Q 40/04; G06Q 30/02; G06Q 30/0206; G06Q 30/0283; G01R 21/00; G01R 29/00; G05B 13/021; G06F 17/40; G06F 19/00; H02J 13/0003; H02J 13/0006; H02J 3/008; H02J 3/32; Y04S 10/54; Y04S 50/10; Y04S 50/14
  See application file for complete search history.

(56) References Cited

U.S. PATENT DOCUMENTS

| | | | | |
|---|---|---|---|---|
| 8,410,634 | B2* | 4/2013 | Park | H02J 3/32 |
| | | | | 307/65 |
| 2003/0220864 | A1* | 11/2003 | Peljto | G06Q 10/06 |
| | | | | 705/37 |
| 2009/0273240 | A1* | 11/2009 | Gurunathan | H02J 9/062 |
| | | | | 307/64 |
| 2010/0179704 | A1 | 7/2010 | Ozog | |
| 2010/0332373 | A1* | 12/2010 | Crabtree | G06Q 40/04 |
| | | | | 705/37 |
| 2012/0010757 | A1* | 1/2012 | Francino | G05B 15/02 |
| | | | | 700/291 |
| 2012/0029720 | A1* | 2/2012 | Cherian | H02J 13/00 |
| | | | | 700/297 |
| 2012/0278220 | A1* | 11/2012 | Chassin | G06Q 40/00 |
| | | | | 705/37 |
| 2013/0159157 | A1* | 6/2013 | Greene | G06Q 10/04 |
| | | | | 705/37 |
| 2013/0270914 | A1* | 10/2013 | Veltri | H02J 3/30 |
| | | | | 307/68 |
| 2014/0330532 | A1* | 11/2014 | Simmons | G06Q 30/08 |
| | | | | 702/60 |
| 2015/0127425 | A1* | 5/2015 | Greene | G06Q 30/0202 |
| | | | | 705/7.31 |

OTHER PUBLICATIONS

Laprie J.-C. et al; "Definition and Analysis of Hardware- and Software-Fault-Tolerant Architectures"; Computer, IEEE; vol. 23; No. 7; pp. 39-51; ISSN: 0018-9162; DOI: 10.1109/2.56851; XP011413302; 1990.

Zhang, Ziang; "Time-Sensitive Cooperative Distributed Energy Management on Cyber-Physical Energy Systems"; 2013.

Wikipedia; Replication (computing); From Wikipedia, the free Encyclopedia; URL: http://en.wikipedia.org/w/index.php?title=Replication_%28computing%29&oldid=587233222; pp. 1-7; XP055167656; 2013.

Internet: http://en.wikipedia.org/wiki/Leader_election retrieved Jan. 29, 2014.

International Search Report PCT/EP2014/074177; International Filing Date: Nov. 10, 2014; 3 pgs.

* cited by examiner

OPTIMIZING THE DISTRIBUTION OF ELECTRICAL ENERGY

CROSS-REFERENCE TO RELATED APPLICATIONS

This application claims priority to PCT Application No. PCT/EP2014/074177, having a filing date of Nov. 10, 2014, based off of DE Application No. 102014201555.3 having a filing date of Jan. 29, 2014, the entire contents of which are hereby incorporated by reference.

FIELD OF TECHNOLOGY

The following relates to the technical field of the distribution of electrical energy.

BACKGROUND

Algorithms regarding the leader election are known: http://en/wikipedia/org/wiki/Leader_election. DE 10 2011 078 045 A1 additionally discloses methods and devices for allocating quantities of energy.

New energy grids, also referred to as soft grids, are composed of autonomous regions, which are also referred to as islands or grid regions and which are balanced among one another by means of the mutual distribution of the energy. This balancing can be realized by a node, which is also referred to as a dispatcher or optimizer and which, on the basis of energy intervals requested by the autonomous regions, collects all the required information by means of a generic interface and/or to which this information is transmitted. Required information may comprise, depending on the island, for example, a forecast energy demand, a forecast energy output and/or flexibility with regard to the forecast energy demand and/or energy output of the island.

The dispatcher then attempts to calculate the optimum distribution of the available energy over the autonomous regions and assigns energy transfers to the latter.

There are various possible approaches for optimizing the distribution of the available energy. The energy flows can be controlled centrally by means of an external dispatcher/optimizer or by one of the peers, that is to say one of the islands, being chosen as a node for the dispatcher/optimizer which calculates the transmissions of energy by means of an algorithm having low complexity.

However, an individual central management node configured as a dispatcher entails disadvantages such as communication bottlenecks, load spikes at one of the peer nodes or a single point of failure. Moreover, it is possible for the central management node to yield only suboptimal results on account of limited time available to it, limited computing power and limited memory space.

In order to alleviate these disadvantages, the following approaches may be employed:
- provisioning the dispatcher with increased resources, e.g. a better CPU;
- passing on the dispatcher role among the available nodes, e.g. always to the node having the fullest battery;
- a central dispatcher with redundant or overprovisioned communication connections;
- concepts for failsafe protection, such as e.g. hot backup of the dispatcher;
- heartbeat monitoring of the dispatcher and selection procedure for replacement in the case of a malfunction.

However, these approaches only alleviate individual disadvantages, and moreover require an increased outlay for their implementation.

SUMMARY

An aspect relates to optimizing the distribution of electrical energy in an electrical power grid comprising autonomous grid regions.

In accordance with one aspect, a method for optimizing the distribution of electrical energy in an electrical power grid is presented. The power grid comprises autonomous grid regions. The method comprises the following method steps: In one method step, input data are received by at least two dispatcher entities. The input data represent energy intervals requested by the autonomous grid regions. In a further method step, at least one solution of the distribution of electrical energy among the grid regions is calculated by each of the at least two dispatcher entities. In a further method step, one of the calculated solutions for the distribution of electrical energy in the power grid is selected.

In accordance with a further aspect, a system for optimizing the allocation of electrical energy in an electrical power grid is presented. The electrical power grid comprises autonomous grid regions. The system comprises at least two dispatcher entities and a selection means or device. Each of the at least two dispatcher entities comprises an interface means or device and a calculation means or device. The interface means or device of the at least two dispatcher entities are in each case adapted to receive input data representing energy intervals requested by the autonomous grid regions. The calculation means or device of the at least two dispatcher entities are in each case adapted to calculate a solution of the distribution of electrical energy among the grid regions. The selection means or device is adapted to select one of the calculated solutions for the distribution of electrical energy in the power grid.

BRIEF DESCRIPTION

Some of the embodiments will be described in detail, with reference to the following figures, wherein like designations denote like members, wherein.

DETAILED DESCRIPTION

Elements having an identical function and effect are provided with the same reference signs in the figures.

Figure 1:
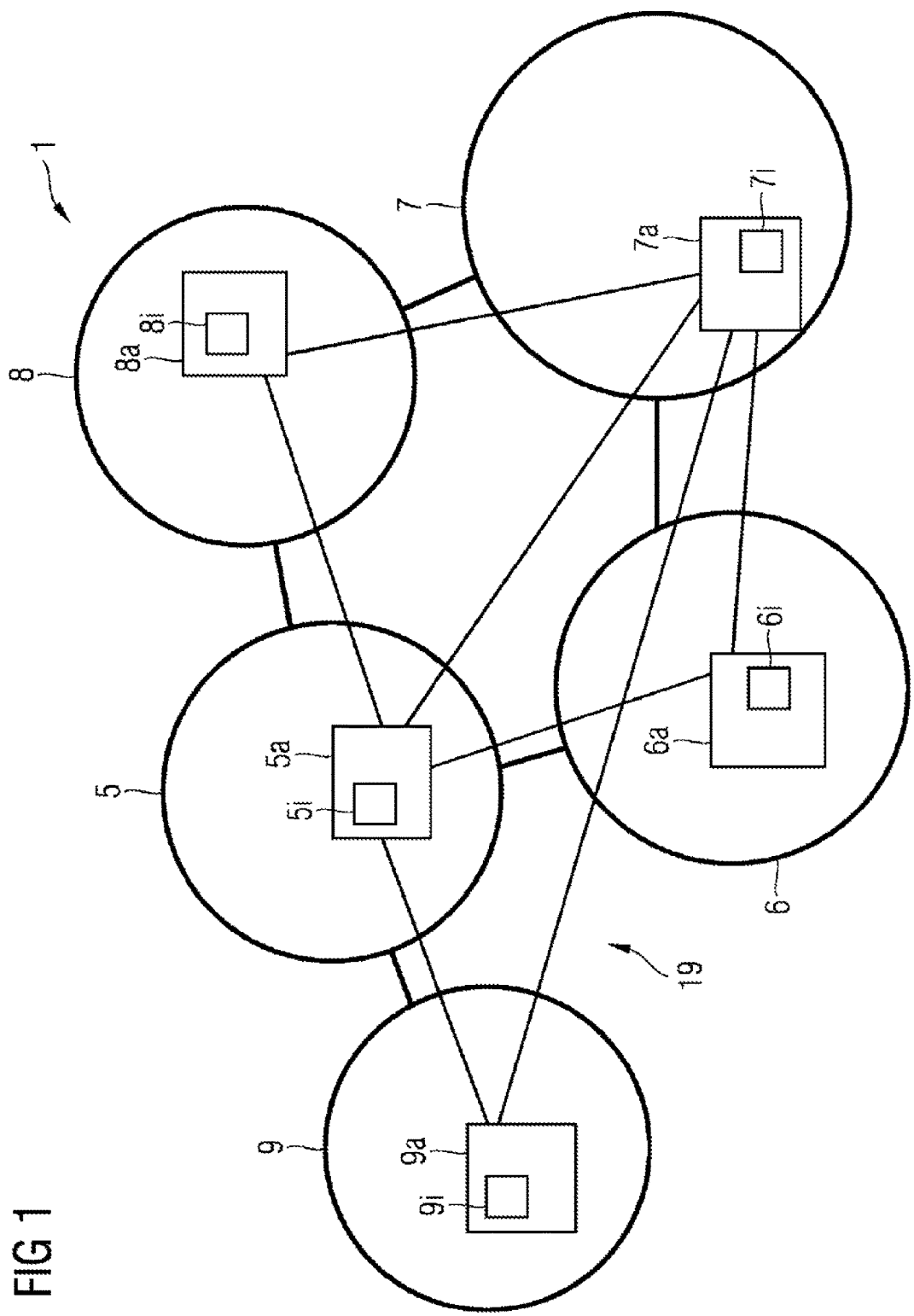
FIG. 1 shows a block diagram of a power grid controlled by a data network, in accordance with one exemplary embodiment of the invention.

FIG. 1 shows a power grid 1, which is controlled by a data network 19, in accordance with one exemplary embodiment of the invention.

The power grid 1 is highlighted in FIG. 1 by the elements depicted using bold lines and comprises the autonomous grid regions 5, 6, 7, 8, 9 and electrical connections that connect the autonomous grid regions to one another. As illustrated in FIG. 1, not all of the autonomous grid regions need be connected to all of the other autonomous grid regions. Rather, there are diverse possibilities for interconnecting the autonomous grid regions. In reality, in a large power grid generally not all grid regions are connected to all grid regions, for cost reasons and on account of geographical conditions.

The data network 19 is highlighted in FIG. 1 by the elements depicted using lines of normal thickness and comprises the entities 5a, 6a, 7a, 8a, 9a and data connections that connect said entities 5a, 6a, 7a, 8a, 9a to form the network 19. The data network 19 need not have the same topology as the power grid 1, rather it can have its own topology. Each of the autonomous grid regions 5, 6, 7, 8, 9 of the power grid comprises at least one entity 5a, 6a, 7a, 8a, 9a which controls the respective autonomous grid region. At least two of the entities 5a, 6a, 7a, 8a, 9a are configured as dispatcher entity. These are the entities 5a and 7a in the exemplary embodiment illustrated in FIG. 1 and FIG. 2.

Figure 2:
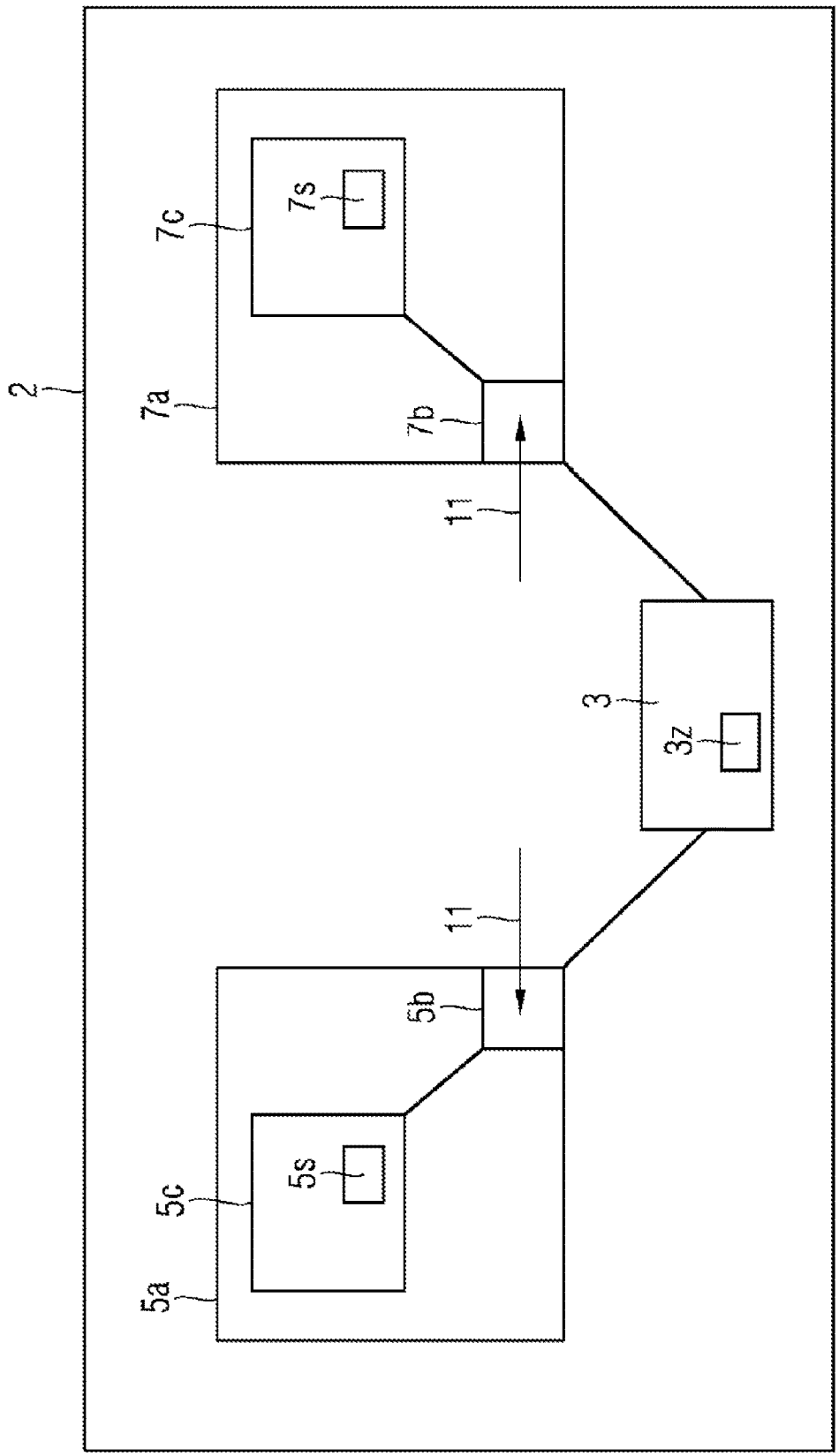
FIG. 2 shows a block diagram of a system in accordance with one exemplary embodiment of the invention for optimizing the allocation of electrical energy in the power grid from FIG. 1.

FIG. 2 shows a system 2 for optimizing the allocation of electrical energy in an electrical power grid 1 comprising autonomous grid regions 5, 6, 7, 8, 9. The system 2 comprises at least two dispatcher entities 5a, 7a and a selection means or device 3. Each of the at least two dispatcher entities 5a, 7a comprises an interface means or device 5b, 7b and a calculation means or device 5c, 7c. Each of the interface means 5b, 7b of the at least two dispatcher entities 5a, 7a is adapted to receive input data 11. The input data represent energy intervals 5i, 6i, 7i, 8i, 9i requested by the autonomous grid regions 5, 6, 7, 8, 9. Each of the calculation means 5c, 7c of the at least two dispatcher entities 5a, 7a is adapted to calculate a solution 5s, 7s of the distribution of electrical energy among the grid regions 5, 6, 7, 8, 9. The selection means 3 is adapted to select one of the calculated solutions 5s, 7s for the distribution of electrical energy in the power grid 1 by means of a leader election.

Figure 3:
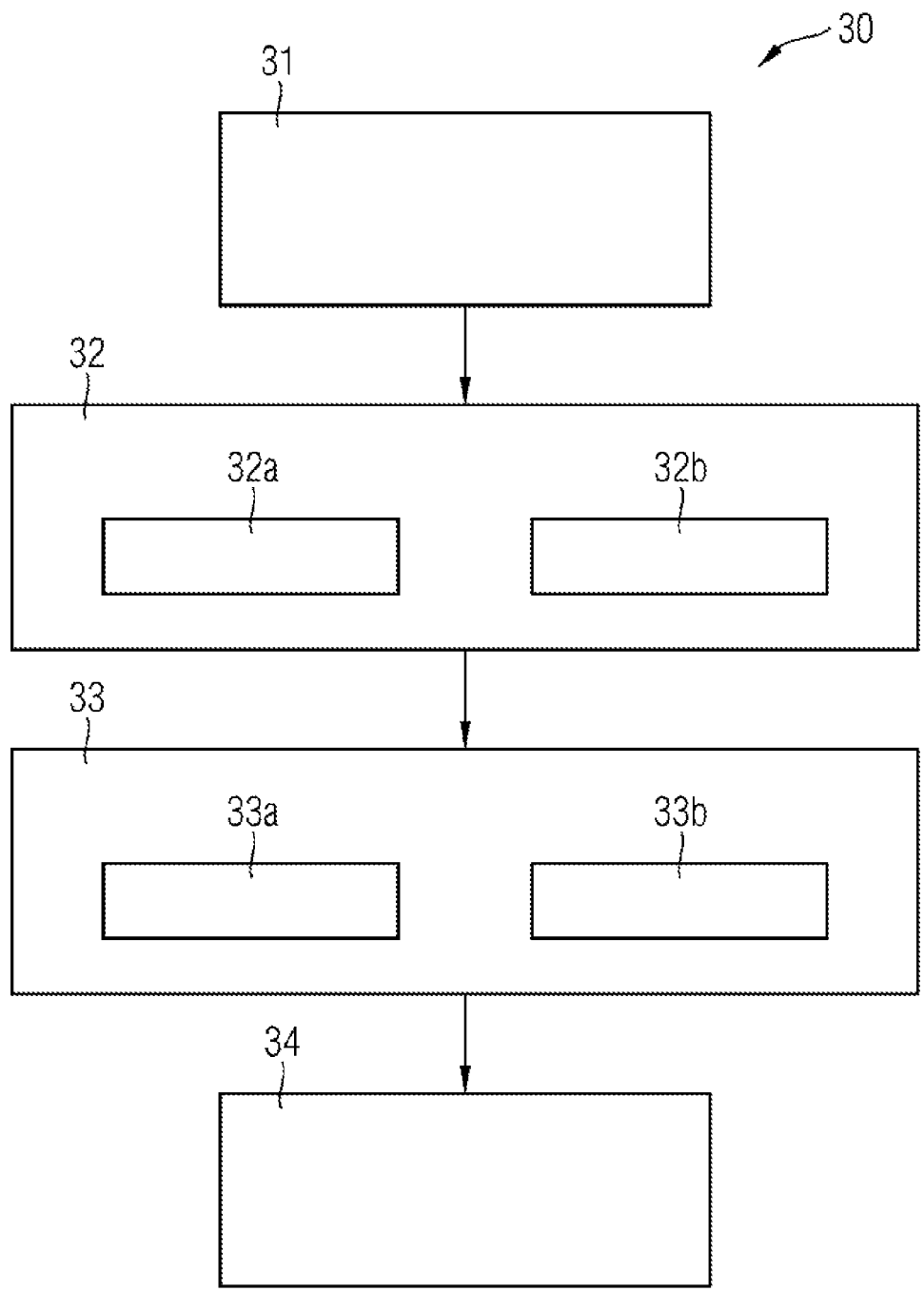
FIG. 3 shows a flow diagram of a method in accordance with one exemplary embodiment of the invention.

FIG. 3 shows a method for optimizing the distribution of electrical energy in the power grid 1 in accordance with one preferred exemplary embodiment of the invention. Method step 31 involves determining, for each of the grid regions 5, 6, 7, 8, 9, its expected energy demand in the form of a respective energy interval 5i, 6i, 7i, 8i, 9i; also see FIG. 1. These energy intervals 5i, 6i, 7i, 8i, 9i are received as input data 11 by two dispatcher entities 5a, 7a in method step 32. The input data 11 thus represent the energy intervals 5i, 6i, 7i, 8i, 9i requested by the autonomous grid regions 5, 6, 7, 8, 9. In this case, in FIG. 3 the reception of the input data I by dispatcher entity 5a is represented by method substep 32a, while the reception of the input data I by dispatcher entity 7a is represented by method substep 32b. In method step 33, each of the at least two dispatcher entities 5a, 7a calculates a solution 5s, 7s of the distribution of electrical energy among the grid regions 5, 6, 7, 8, 9. In FIG. 3 the calculation of the solution 5s by the dispatcher entity 5a is represented by method substep 33a, while the calculation of the solution 7s by the dispatcher entity 7a is represented by method substep 33b. In method step 34, one of the calculated solutions 5s, 7s for the distribution of electrical energy in the power grid 1 is selected by means of a leader election. For this purpose, for example, the selection means 3 may be adapted to evaluate the calculated solutions 5s, 7s by a target value function 3z and to compare them with one another in the leader election. In this case, the target value function yields for each of the solutions 5s, 7s, for example a scalar value which represents the quality of the solution, and thus enables the comparison. Instead of scalar values, however, the target value function 3z may for example also yield vectors which enable a comparison.

In accordance with preferred exemplary embodiments, all of the at least two dispatcher entities 5a, 7a receive the same input data 11.

In accordance with further preferred exemplary embodiments, the at least two dispatcher entities 5a, 7a are adapted to calculate in each case different solutions 5s, 7s of the distribution of electrical energy among the grid regions 5, 6, 7, 8, 9. This may preferably be achieved for example by virtue of the fact that the at least two dispatcher entities 5a, 7a are adapted to select, for the calculation of the respective at least one solution, different start populations within the energy intervals 5i, 6i, 7i, 8i, 9i. A further possibility, however, is for example that the at least two dispatcher entities 5a, 7a are adapted to use different algorithms for the calculation of the respective at least one solution 5s, 7s.

In accordance with further preferred exemplary embodiments, the grid regions 5, 6, 7, 8, 9 will be represented logically as a selection from energy producers, energy consumers and prosumers. In this case, prosumers constitute grid regions which can either produce or consume energy. This is the case for example with pumped-storage power plants. A further example of a prosumer may also constitute an electric vehicle or a group of electric vehicles whose battery, for stabilizing the power grid, depending on grid demand, can be charged or can make electricity available to the power grid. In the case of a prosumer, the requested energy interval can overlap zero, e.g. battery can be charged and discharged.

As illustrated in FIG. 2, the system 2 may comprise only the dispatcher entities 5a, 7a and the selection means, or it may also comprise the power grid. The power grid 1 is or comprises a DC voltage grid or an AC voltage grid.

In preferred embodiments the target value function 3z is defined for the dispatcher entity and represents the optimality of the solution calculated by the dispatcher entity for the distribution of electrical energy. This is a byproduct of the actual calculation of the optimum distribution of the energy.

This may be achieved for example by virtue of the fact that, in a concrete implementation, the values of a cost function, as described in the German patent application DE102011078045 A1, are summed for the assigned energy coordinates. The cost function is transmitted in the input data 11 with the energy intervals 5i, 6i, 7i, 8i, 9i and expresses a preference within the energy interval, namely to optimize the costs. The optimization is intended to attempt always to achieve the minimum of the cost function.

The required information for the respective dispatcher entity 5a, 7a is preferably broadcast by each of the entities in order that the dispatcher entities have available a possible complete data set for the calculation of the distribution of the electrical energy. In this case, each entity embodied as node 5a, 6a, 7a, 8a, 9a receives the information and relays it as required in order to make a complete image available to all further entities 5a, 6a, 7a, 8a, 9a.

In accordance with a further preferred embodiment, all entities 5a, 6a, 7a, 8a, 9a function as dispatcher entity in order to calculate a solution configured as energy distribution using the broadcast information and randomly chosen initial starting states. After the calculation, or if the allotted time window for the calculation has elapsed, each entity 5a, 6a, 7a, 8a, 9a broadcasts the value of the target value function for its respectively calculated solution.

The entities 5a, 6a, 7a, 8a, 9a compare their values in accordance with a bullying scheme. This means that a node broadcasts its resulting value of the target value function. If one dispatcher entity 5a, 6a, 7a, 8a, 9a receives a message from another dispatcher entity 5a, 6a, 7a, 8a, 9a with a lower, that is to say less optimal, value, it broadcasts a message with its own higher value. If messages are no longer obtained within a given time after the last message, that solution having the last and thus highest value wins. By way of example, that dispatcher entity 5a, 6a, 7a, 8a, 9a with the best solution wins and transmits its calculated solutions for the distribution of electrical energy to the other entities 5a, 6a, 7a, 8a, 9a, which then implement the calculated distribution of the electrical energy among the autonomous grid regions 5, 6, 7, 8, 9.

Other methods different than the bullying algorithm may also be used, such as, for example, a ring algorithm; see http://en.wikipedia.org/wiki/Leader_election.

In accordance with preferred embodiments, instead of an individual dispatcher entity, the optimization of the distribution of electrical energy is performed in a manner distributed over two or more dispatcher entities 5a, 6a, 7a, 8a, 9a. As a result, the problem of a single point of failure is eliminated and the stability is increased. Moreover, the calculated solutions can be improved by the distributed calculation since these solutions of a plurality of dispatcher entities are compared and the best solution is selected. It also enables individual nodes 5a, 6a, 7a, 8a, 9a to function as a dispatcher entity and to participate in the calculation of the solution, or not to do this owing to limited resources.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A method for optimizing the distribution of electrical energy in an electrical power grid comprising autonomous grid regions, comprising the following method steps:
receiving input data by at least two dispatcher entities, wherein the input data represent energy intervals requested by the autonomous grid regions, and wherein the system does not include an individual central management node including a calculating device for calculating a solution of the distribution of electrical energy among all the autonomous grid regions based on the input data;
calculating at least one solution of the distribution of electrical energy among all the autonomous grid regions based on the input data, wherein calculating is performed by each of the at least two dispatcher entities;
selecting one of the calculated solutions for the distribution of electrical energy in the power grid;
implementing, by each of the at least two dispatcher entities, the selected calculated solution and distributing electrical energy among all the autonomous grid regions in the power grid based upon the selected calculated solution.

2. The method as claimed in claim 1, wherein selecting one of the calculated solutions further comprises the procedure that the calculated solutions are evaluated by a target value function and compared with one another in a leader election.

3. The method as claimed in claim 1, wherein all of the at least two dispatcher entities receive the same input data, including input data related to other dispatcher entities.

4. The method as claimed in claim 1, wherein the at least two dispatcher entities in each case calculate different solutions of the distribution of electrical energy along the autonomous grid regions.

5. The method as claimed in claim 1, wherein the at least two dispatcher entities for the calculating of the respective at least one solution select different start populations within the energy intervals.

6. The method as claimed in claim 1, wherein the at least two dispatcher entities use different algorithms for the calculation of the respective at least one solution.

7. The method as claimed in claim 1, wherein for calculating at least one solution of the distribution of electrical energy among the autonomous grid regions, the autonomous grid regions are represented logically as a selection from energy producers, energy consumers and prosumers.

8. The method as claimed in claim 1, wherein the electrical power grid is a DC voltage grid.

9. The method as claimed in claim 1, wherein selecting one of the calculated solutions for the distribution of electrical energy in the power grid is performed by a leader election.

10. A system for optimizing the allocation of electrical energy in an electrical power grid comprising:
a plurality of autonomous grid regions;
a plurality of dispatcher processors, wherein each dispatcher processor of the plurality of dispatcher processors controls a respective autonomous grid region of the plurality of autonomous grid regions;
further wherein each dispatcher processor is configured to receive input data representing energy intervals requested by the plurality of autonomous grid regions and to calculate a solution of the distribution of electrical energy among all of the autonomous grid regions of the plurality of autonomous grid regions without a central management node;
wherein the system is configured to select one of the calculated solutions for the distribution of electrical energy among all of the autonomous grid regions of the plurality of autonomous grid regions in the power grid;
wherein the dispatcher processor that calculated the selected calculated solution is configured to transmit the selected calculated solution to the other dispatcher processors of the plurality of dispatcher processors; and
wherein the dispatcher processors are configured to implement the selected calculated solution for the distribution of electrical energy among all of the autonomous grid regions of the plurality of autonomous grid regions in the power grid.

11. The system as claimed in claim 10, wherein the system is configured to evaluate the calculated solutions by a target value function and to compare them with one another in a leader election.

12. The system as claimed in claim 10, wherein the system is configured such that all of the dispatcher processors receive the same input data, including input data related to all autonomous grid regions of the plurality of autonomous grid regions.

13. The system as claimed in claim 10, wherein the at least two dispatcher processors are configured to calculate in each case different solutions of the distribution of electrical energy among the autonomous grid regions.

14. The system as claimed in claim 10, wherein the at least two dispatcher processors are configured to select, for the calculation of the respective at least one solution, different start populations within the energy intervals.

15. The system as claimed in claim 10, wherein the at least two dispatcher processors are configured to use different algorithms for the calculation of the respective at least one solution.

16. The system as claimed in claim 10, wherein the system is configured for calculating at least one solution of the distribution of electrical energy among the autonomous grid regions, to represent the autonomous grid regions logically as a selection from energy producers, energy consumers and prosumers.

17. The system as claimed in claim 10, wherein the system comprises the electrical power grid.

18. The system as claimed in claim 17, wherein the power grid comprises or is a DC voltage grid.

19. The system as claimed in claim 10, wherein the system is configured to select one of the calculated solutions for the distribution of electrical energy in the power grid by a leader election.

20. A system for optimizing the allocation of electrical energy in an electrical power grid comprising:
   autonomous grid regions; and
   at least two dispatcher computers;
   wherein the system does not include an individual central management node including a calculating device for calculating a solution of the distribution of electrical energy among all the autonomous grid regions;
   wherein the at least two dispatcher computers are in each case configured to receive input data representing energy intervals requested by all the autonomous grid regions;
   wherein the at least two dispatcher computers are in each case configured to calculate a solution of the distribution of electrical energy among all the autonomous grid regions based on the received input data representing energy intervals requested by all the autonomous grid regions; and
   wherein the system is configured to select one of the calculated solutions for the distribution of electrical energy among all the autonomous grid regions in the power grid.

* * * * *